United States Patent
Manni (10) Patent No.: US 12,035,095 B2
(45) Date of Patent: Jul. 9, 2024

(54) HEADPHONE ADAPTER

(71) Applicant: Varjo Technologies Oy, Helsinki (FI)

(72) Inventor: Jukka Manni, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 184 days.

(21) Appl. No.: 17/901,373

(22) Filed: Sep. 1, 2022

(65) Prior Publication Data

US 2024/0080606 A1 Mar. 7, 2024

(51) Int. Cl.
*H04R 1/10* (2006.01)
*G02B 27/01* (2006.01)
*H04R 5/033* (2006.01)

(52) U.S. Cl.
CPC ......... *H04R 1/105* (2013.01); *G02B 27/0176* (2013.01); *H04R 1/1008* (2013.01); *H04R 1/1058* (2013.01); *H04R 1/1066* (2013.01); *H04R 5/0335* (2013.01); *H04R 2499/15* (2013.01)

(58) Field of Classification Search
CPC .... H04R 1/1008; H04R 1/105; H04R 1/1058; H04R 1/1066; H04R 5/0335; H04R 2499/15; G02B 27/0176
See application file for complete search history.

(56) References Cited

U.S. PATENT DOCUMENTS

| 6,392,798 | B1* | 5/2002 | Newkirk | G02B 27/0176 |
| | | | | 359/477 |
| 2017/0052378 | A1* | 2/2017 | Yang | G02B 27/0176 |
| 2020/0301152 | A1* | 9/2020 | Baudou | G02B 27/0176 |

* cited by examiner

*Primary Examiner* — Huyen D Le
(74) *Attorney, Agent, or Firm* — Ziegler IP Law Group LLC (57) ABSTRACT

Disclosed is a headphone adapter (100, 204) having: first element (102) having first part (104) and second part (106) attached to first part, wherein recess (108) is defined between first part and second part; second element (110) having first end (112), second end (114) opposite to first end, and at least one third part (116) extending between first end and second end, wherein second element is rotatably attached to first element at first end; and third element (118) having fourth part (120) and attachment parts (122, 124) extending from fourth part, wherein fourth part is rotatably attached to second element at second end, and wherein headphone adapter, in use, enables attachment of a headphone device (216, 302) to a head-mounted device (208, 306) such that headband (206, 304) of head-mounted device passes through the recess defined in first element, and headband (214) of headphone device is attached to third element.

13 Claims, 6 Drawing Sheets

HEADPHONE ADAPTER

TECHNICAL FIELD

The present disclosure relates to headphone adapters for enabling attachment of headphone devices to head-mounted devices. The present disclosure also relates to systems comprising headphone devices, head-mounted devices, and headphone adapters.

BACKGROUND

In present times, head-mounted devices are popularly used by people for various purposes such as, protection of the user's head, experiencing visual content, improving vision, and the like. Some head-mounted devices (for example, such as extended-reality devices) provide audio content in addition to the visual content, for providing an immersive, multisensory experience. A user typically wears a head-mounted device around his/her head in a manner that a main element (for example, such as an optics element, a protection element, and similar) of the head-mounted device is arranged in front of the user's eyes/face and a headband of the head-mounted device to which the main element is attached, is arranged around the user's head. Nowadays, various types of head-mounted devices are available for use, such head-mounted devices having varied functionalities and physical designs.

Some existing head-mounted devices have built-in audio solutions to provide the audio content, but a size, a weight, and an audio quality of such audio solutions is very limited. For example, some head-mounted devices have speakers hanging from headbands of said devices. These speakers may touch the user's ears, for example, when the speakers are pushed against the user's ears using a small spring force.

Alternatively, these speakers may not touch the user's ears, and instead hang freely in proximity of the user's ears. Many other existing head-mounted devices do not have built-in audio solutions. Such a head-mounted device requires a headphone device to be used along with the head-mounted device, which is quite cumbersome for the user. Firstly, the headphone device is also worn over the user's head, so its earpads/earpieces often interfere with the head-mounted device. Furthermore, passive noise cancellation requires quite a lot of force to close air compartments of user's ears and block noise using earpads (namely, earcups). It is very difficult to generate enough force for the passive noise cancellation if the headphone device is supported only to a headband of the head-mounted device. Dimensions of the earpads are also often problematic in terms of fitting the closed earpads in a manner that they don't interfere with the headband of the head-mounted device.

Therefore, in light of the foregoing discussion, there exists a need to overcome the aforementioned drawbacks associated with integration of audio solutions with head-mounted devices.

SUMMARY

The present disclosure seeks to provide a headphone adapter. The present disclosure also seeks to provide a system comprising a headphone device, a head-mounted device, and at least one headphone adapter. An aim of the present disclosure is to provide a solution that overcomes at least partially the problems encountered in prior art.

In a first aspect, an embodiment of the present disclosure provides a headphone adapter having:
- a first element having a first part and a second part that is attached to the first part, wherein a recess is defined between the first part and the second part;
- a second element having a first end, a second end opposite to the first end, and at least one third part extending between the first end and the second end, wherein the second element is rotatably attached to the first element at the first end; and
- a third element having a fourth part and attachment parts extending from the fourth part, wherein the fourth part is rotatably attached to the second element at the second end, and wherein the headphone adapter, in use, enables attachment of a headphone device to a head-mounted device such that a headband of the head-mounted device passes through the recess defined in the first element, and a headband of the headphone device is attached to the third element.

In a second aspect, an embodiment of the present disclosure provides a system comprising a headphone device, a head-mounted device, and at least one headphone adapter according to the first aspect.

Embodiments of the present disclosure substantially eliminate or at least partially address the aforementioned problems in the prior art, and enable provision of a headphone adapter that enables easy and secure detachable attachment of a headphone device with a head-mounted device, and also enables adjustment of the headphone device with respect to the head-mounted device.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIGS. 1A and 1B illustrate perspective views of a headphone adapter, while

FIG. 2A illustrates a perspective view of a tying element, while

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a headphone adapter having:
- a first element having a first part and a second part that is attached to the first part, wherein a recess is defined between the first part and the second part;
- a second element having a first end, a second end opposite to the first end, and at least one third part extending between the first end and the second end, wherein the second element is rotatably attached to the first element at the first end; and
- a third element having a fourth part and attachment parts extending from the fourth part, wherein the fourth part is rotatably attached to the second element at the second end, and wherein the headphone adapter, in use, enables attachment of a headphone device to a head-mounted device such that a headband of the head-mounted device passes through the recess defined in the first element, and a headband of the headphone device is attached to the third element.

In a second aspect, an embodiment of the present disclosure provides a system comprising a headphone device, a head-mounted device, and at least one headphone adapter according to the first aspect.

The present disclosure provides the aforementioned headphone adapter and the aforementioned system. The headphone adapter supports integration of various types of headphone devices with various types of head-mounted devices in a simple, non-obstructive (i.e., non-interfering) manner. For head-mounted devices that lack a built-in audio solution or have poor built-in audio solutions, the headphone adapter enables secure and effective attachment of a separate audio solution (i.e., the headphone device) for providing audio content. The headphone device may alternatively be used to protect the user's ears from noise-related damage and in this case, the headphone adapter enables protection of the user's ears. The headphone adapter also provides requisite support to the headphone device when it is attached to the headband of the head-mounted device, so that enough force is generated to block noise using earpads of the headphone device for effective passive noise cancellation. The headphone adapter is small in size, is made using inexpensive and easy to procure materials, and is ergonomically designed. Moreover, the headphone adapter has two rotational couplings therein which enable i) adjustment of earpads/earpieces of the headphone device with respect to the user's head, and ii) adjustment of the earpads/earpieces of the headphone device with respect to the headband of the head-mounted device. The user can manually adjust the different elements of the headphone adapter to achieve a comfortable snug fit of the headphone adapter about the headband of the head-mounted device and of the headband of the headphone device about the headphone adapter. The headphone adapter is capable of being manufactured using three-dimensional (3D) printing, and can also be mass produced. The system described herein provides a comprehensive audio-visual immersive multisensory experience, whilst ensuring that the at least one headphone adapter enables effective and secure detachable attachment of the headphone device and the head-mounted device with each other, as required.

Throughout the present disclosure, the term "headphone adapter" refers to a device that enables physical attachment of the headphone device to the head-mounted device. In particular, the headphone adapter adapts a physical form of the headphone device to a physical form of the head-mounted device, such physical forms being otherwise incompatible for attachment without the headphone adapter. Both the headphone device and the head-mounted device are attached to the headphone adapter, and in turn, to each other. The headphone adapter is a portable, inexpensive, small-sized device that allows the headphone device to be detachably attached to the head-mounted device, as required. Typically, when the head-mounted device is used, the headphone device is used along with it. The headphone adapter is usable to enable any type of headphone device to be attached to any type of head-mounted device, without dangling speaker elements, interference of ear cups with the headband of the head-mounted device, and similar issues.

Throughout the present disclosure, the term "headphone device" refers to a device having a pair of small loudspeakers, the device being worn on or around a user's head such that the pair of small loudspeakers provide sound to the user's ears. Optionally, the headphone device is one of: an over-ear headphone device, an on-ear headphone device, an in-ear headphone device, a hearing protection device. The over-ear headphone device (namely, circumaural or over-the-ear headphone device) has earpads that fit around the user's ears to provide passive noise cancellation, high sound quality, and a rich sound quality. The on-ear headphone device (namely, supra-aural headphone device) has smaller earpads than the over-ear headphone device so provides relatively lesser noise cancellation than the over-ear headphone device, but provides a stable fit on the user's ears. The headphone adapter enables sufficient push (i.e., force) of the earpads of the aforesaid headphone devices against the user's ears. This enables closing of air compartments in the user's ears and blocking of noise, for effective passive noise cancellation. The in-ear headphone device (namely, earbuds or earphones) is small-sized, has a stable fit, and provides effective noise isolation. The in-ear headphone device often has small sized and ergonomically design earpieces that fit snugly in the user's ears. The hearing protection device (HPD) is a device that is worn to protect the user's ears against hazardous noise and/or to help in preventing noise-induced hearing loss. The HPD provides such functionality by reducing a level of noise entering the user's ears. The HPD, in use, is worn in or over the user's ears, depending on its design. The HPD can include earpads or earpieces. The aforementioned different types of headphone devices are different from each other in terms of their physical design, and the headphone adapter beneficially supports attachment of each of such different types of headphone devices to the head-mounted device without any of their earpads/earpieces interfering with the headband of the head-mounted device. This enables a user of the head-mounted device to freely select any type of headphone device for attachment with the head-mounted device, using the headphone adapter.

Throughout the present disclosure, the term "head-mounted device" refers to a device worn on or around a user's head. Optionally, the head-mounted device is one of: an extended-reality (XR) device, a display device, a helmet, a visor, a pair of goggles. The XR device is a specialized equipment that is configured to present an XR environment to a user when the XR device in operation is worn by the user on his/her head. In such an instance, the XR device acts as a display device (for example, such as an XR headset, a pair of XR glasses, and the like) that is operable to present a visual scene of the XR environment to the user. The visual scene of the XR environment comprises a sequence of XR images. Herein, the term "extended-reality" encompasses virtual reality (VR), augmented reality (AR), mixed reality (MR), and the like. The term "display device" refers to any device that is capable of displaying images and/or videos to a user. The display device may, for example, be a three-dimensional (3D) video display device, a two-dimensional (2D) image display device, and similar. The helmet is typically a device used to protect the user's head. The visor is device that is typically worn to protects the user's eyes (for example, from rays of the sun, harmful bright light, and similar). The pair of goggles may be used to correct the user's vision, or provide a visual experience to the user. It will be appreciated that the aforementioned different types of head-mounted devices are structurally different from each other, and the headphone adapter beneficially supports attachment of each of such different types of head-mounted devices to the headphone device. This enables the user to use any type of the head-mounted device with any type of headphone device, using the headphone adapter.

Optionally, the headband of the headphone device and/or the headband of the head-mounted device comprises at least one of: an opening, a telescopic portion, a padding. Moreover, optionally, the headband of the headphone device and/or the headband of the head-mounted device are made using at least one of: an inflexible material, a flexible material. Examples of inflexible materials include, but are not limited to, hard plastics, wood, and composites. Examples of flexible materials include, but are not limited to, flexible plastics, silicone, and rubber. Optionally, a length of the headband of the head-mounted device is adjustable using an adjustment mechanism.

The "first element" of the headphone adapter is that element of the headphone adapter which, in use, is attached with the headband of the head-mounted device. It will be appreciated that the first element is ergonomically designed in a manner that its form factor enables easy, comfortable, and non-obstructive attachment of the headphone adapter with the headband of the head-mounted device. Optionally, the first element is made using at least one of: an inflexible material, a flexible material.

In some implementations, the first part and the second part are separate from each other and are attached prior to use of the headphone adapter. In this regard, the first part and the second part are designed in a manner that upon their attachment, the recess is formed therebetween. Optionally, in such implementations, an attachment element is employed to attach the first part and the second part. Optionally, the second part is attached to the first part using at least one of: a screw, a bolt, a hook and loop fastener, a hinge. Such attachment elements are inexpensive, easy to procure, and easy to use. It will be appreciated that other attachment elements (such as rubber bands, ties, and the like) besides the aforesaid attachment elements could also be utilized for attaching the first part and the second part. In an example the second part is attached to the first part using two screws. Alternatively, optionally, in such implementations, the first part and the second part are attached via a snap fit connection therebetween. In such a case, at least one of the first part and the second part is made of a flexible material, and the first part and the second part are designed in a manner that when the one of the first part and the second part is engaged (for example, by pushing, bending, pressing, and the like) to attach with other of the first part and the second part, a protrusion in the one of the first part and the second part interlocks with a mating depression in the other of the first part and the second part.

In some other implementations, the first part and the second part are integrally attached to each other. In this regard, the first part and the second part are implemented as a single part having the recess formed therein. When the single part is non-openable, the headphone adapter can be attached with head-mounted devices having openable headbands that can be threaded through the recess, and in particular, through at least two openings in the recess that are opposite to each other. When the single part is openable, the single part can be opened to arrange the headband of the head-mounted device for passing through the recess and be closed to secure said headband in the recess. Such an openable single part enables attachment of the headphone adapter with any type of headband of the head-mounted device. The single part that is openable may be opened from two or more sides thereof. In an example, the single part may be opened from two opposite sides—one side from which the headband of the head-mounted device is threaded into the single part and other side from which said headband is threaded out of the single part. In another example, the single part may also be openable from another side (for example, a bottom side that faces the user's shoulder, when the headphone adapter is in use) in addition to the two opposite sides of the aforesaid example. Optionally, in such implementations, at least one of the first part and the second part are manufactured using the flexible material.

The recess defined between the first part and the second part is a through-recess. This means that the headband of the head-mounted device can pass through the recess. It will be appreciated that a width of the recess is equal to or greater than a width of the headband of the head-mounted device. As an example, when the width of the headband of the head-mounted device is 1 inch, a headphone adapter in which the recess has a width of 1 inch or greater than that may be employed for enabling attachment of the headphone device to the head-mounted device. In some implementations, the recess has a fixed width and thus attachment of the first element is supported for selective widths of headbands of the head-mounted device which are equal to or less than the fixed width. In other implementations, the recess has an adjustable width and thus attachment of the first element is supported for a multitude of widths of headbands of the head-mounted device. In this regard, the first part and the second part have telescopic portions that enable extension and retraction of the first part and the second part, to enable adjustment of the width of the recess.

Optionally, a shape and/or a size of the first part and the second part is selected to be such that when the first part and the second part are attached and the headband of the head-mounted device is arranged to pass through the recess, at least a portion of the second part presses said headband against the first part for secure attachment of the first element with said headband. In this regard, the headband of the head-mounted device is held securely in place within the recess and the headphone adapter does not keep sliding off when in use. In some implementations, at least one tab portion (for example, such as two tab portions parallel to a length of the headband of the head-mounted device) of the second part presses said headband against the first part, whereas in other implementations, an entirety of the second part presses said headband against the first part.

Optionally, a side of the first part that would be in contact with the user's head when the headphone adapter is in use, is curved corresponding to a curved shape of the user's head. This enables a comfortable fit of the headphone adapter against the user's head.

The "second element" of the headphone adapter is that element of the headphone adapter which is attached as an intermediate element between the first element and the second element. The second element enables at least raising or lowering of the headphone device with respect to the headband of the head-mounted device. By rotating the second element with respect to the first element, a position of the earpads/earpieces of the headphone device with respect to the user's ears can be adjusted. The second element is rotatably moved to be close to/away from the user's head so that the earpads/earpieces of the headphone device are arranged above/on or in the user's ears. It will be appreciated that the second element is ergonomically designed in a manner that its form factor enables easy and non-obstructive movement of the headphone device with respect to the headband of the head-mounted device. Optionally, the second element is made using at least one of: an inflexible material, a flexible material.

Optionally, the at least one third part is implemented as a single part (i.e., a single third part). Alternatively, optionally, the at least one third part comprises two third parts that are joined longitudinally with each other using an attachment means. In this regard, the two third parts have complimentary designs so that when joined, they collectively form the second element having the first end and the second end. Each of the two third parts has a longitudinal end that is adapted for joining with a complementary longitudinal end of other of the two third parts. Optionally, the longitudinal ends of the two third parts that are to be joined have ridges thereon. The ridges enable better joining of the two third parts as compared to an implementation without the ridges. Transverse ends of the two third parts that lie on a same side of the two third parts upon their joining collectively constitute a given end (i.e., the first end, the second end) of the second element. Optionally, the attachment means is at least one of: a screw, a bolt, a rivet, a clamp, an adhesive. Such attachment means are inexpensive, and easy to procure and use. It will be appreciated that other suitable types of attachment means can also be employed for joining the two third parts. In an example, two screws are employed for longitudinally joining the two third parts.

Optionally, both transverse ends of the two third parts are designed to support rotational motion of the second element via requisite joints. The transverse ends are named so since they lie perpendicular to the longitudinal ends of the two third parts. The transverse ends have a geometry including one or more of: a planar portion, a curved portion, a freeform-shaped portion.

Optionally, the second element is rotatably attached to the first element at the first end via a first joint, the first joint being one of: a cylindrical joint, a revolute joint, a ball and socket joint. In an embodiment, the first joint is formed between the first end of the second element and the first part of the first element. In another embodiment, the first joint is formed between the first end of the second element and the second part of the first element. The first joint has at least one rotational degree of freedom (DoF). In implementations where the first joint is one of the cylindrical joint and the revolute joint, the first joint has one rotational DoF and may also have at least one translational DoF. Both the cylindrical joint and the revolute joint constrain rotational movement of the second element about a single axis that lies along the first end of the second element. In this regard, the first joint is such that it allows nearly free rotation about the single axis. In particular, the first joint may permit rotational movement of nearly 360 degrees about the single axis. The cylindrical joint may permit translation of the second element along the single axis. In implementations where the first joint is the ball and socket joint (or simply, a ball joint), the first joint has three rotational DoF. The ball and socket joint has rotational symmetry and thus rotation can occur along any axis.

The "third element" of the headphone adapter is that element of the headphone adapter which, in use, is attached with the headband of the headphone device. It will be appreciated that the third element is ergonomically designed in a manner that its form factor enables easy, comfortable, and non-obstructive attachment of the headphone adapter with the headband of the headphone device and also enables easy rotation of the headphone device. Optionally, the third element is made using at least one of: an inflexible material, a flexible material.

The fourth part of the third element is designed in a manner that a first surface of the fourth part is rotatably attached to the second end of the second element, and a second surface of the fourth part, which is opposite to the first surface, receives a portion of the headband of the headphone device thereon for enabling attachment of the headphone device to the headphone adapter. Optionally, the fourth part is curved in shape. In this regard, the fourth part is curved inwards (i.e., in a concave manner) towards the second end of the second element.

Optionally, the fourth part is rotatably attached to the second element at the second end via a second joint, the second joint being one of: a ball and socket joint, a universal joint. Optionally, the second joint is formed between a central portion of the fourth part and the second end of the second element. The second joint has at least two rotational DoF. In implementations where the second joint is the ball and socket joint, the second joint has three rotational DoF. In other implementations where the second joint is the universal joint, the second joint has two rotational DoF or three rotational DoF.

The attachment parts extending from the fourth part enable attachment of the headband of the headphone device with the third element. The attachment parts are designed such that in some implementations, they do not require any additional component for enabling the attachment of the headband of the headphone device with the third element. In such implementations, the attachment parts can be, for example, snap-fit attachment parts, clamp attachment parts, hook and loop fastener parts, clip-like attachment parts, or similar. Alternatively, in some implementations, the attachment parts are designed such that in some implementations, they require additional component(s) for enabling the attachment of the headband of the headphone device with the third element. Such implementations are discussed below in more detail.

Optionally, the attachment parts are implemented as projecting tabs, and wherein the headphone adapter further comprises a tying element for enabling secure attachment of the headband of the headphone device to the projecting tabs. The projecting tabs extend from (i.e., project from) the fourth part, and enable attachment of the headband of the headphone device to the third element, using the tying element. For making said attachment, the headband of the headphone device is arranged to rest on the second surface the fourth part and then the tying element is used to securely tie said headband and the fourth part with each other using the projecting tabs. The projecting tabs may extend from two or more sides of the fourth part. One or more projecting tabs may extend from a given side of the fourth part. Optionally, a number of the projecting tabs may be 2, 3, 4, and similar. For secure attachment, the headband of the headphone device is required to be attached to at least two projecting tabs. In an example, two projecting tabs may extend from two opposite sides of the fourth part, said sides being oblique or perpendicular to a lengthwise dimension of the headband of the headphone device. The "tying element" is an element that is usable to tie the headband of the headphone device with the third element (and in particular, with the projecting tabs). Notably, the tying element is physically separate from the arrangement of the first element, the second element, and the third element of the headphone adapter, but is still a constituent element of the headphone adapter. The tying element can be implemented in several ways, as discussed below.

Optionally, the tying element is implemented as at least one of: an elongate body having a plurality of openings therein, a band made from elastic material, a rubber band, a cable tie, a twist tie. In an embodiment where the tying element is implemented as the elongate body having the plurality of openings therein, a number of the plurality of openings is equal to or greater than the number of the projecting tabs. Optionally, the plurality of openings are arranged at least longitudinally (i.e., lengthwise) along the elongate body. In this regard, the plurality of openings may also be arranged transversally and/or obliquely along the elongate body. Optionally, the elongate body is made using the flexible material. For tying the headband of the headphone device with the third element, N openings in the elongate body are stretched and tightly fit around N projecting tabs, N being greater than or equal to two. It will be appreciated that shapes and sizes of the plurality of openings correspond to shapes and sizes of the projecting tabs, so that the openings fit snugly about the projecting tabs. In an embodiment where the tying element is implemented as the band made from elastic material, the rubber band or the twist tie, the tying element is made of a flexible material. The band made from elastic material may be stretched and knotted around/tied around/fit about an arrangement of the headband of the headphone device and the projecting tabs. The rubber band may be stretched and tied around/fit about the arrangement of the headband of the headphone device and the projecting tabs. The rubber band may be made using one or more of natural rubber, synthetic rubber, nitrile rubber, silicone rubber, urethane rubbers, polyether rubbers, chloroprene rubber, and similar. The twist tie may be wound around the arrangement of the headband of the headphone device and the projecting tabs and may be twisted about the projecting tabs to ensure secure attachment. In an embodiment where the tying element is implemented as the cable tie, the cable tie may be wound around the arrangement of the headband of the headphone device and the projecting tabs and secured subsequently.

Optionally, when the headphone adapter is in use, an axis of rotation of the fourth part with respect to the second end of the second element is different from an axis of rotation of the first end of the second element with respect to the first element. In this regard, the axis of rotation of the first end of the second element with respect to the first element enables rotational motion of the second element so that the second element can be rotatably moved close to or away from the user's head. Said axis of rotation is fixed at all times and does not enable any other direction of rotational motion. The axis of rotation of the fourth part with respect to the second end of the second element enables rotational movement of the headband of the headphone device with respect to the headphone adapter (and in particular, with respect to the second end of the second element). Said axis of rotation is not fixed and enables rotational motion along at least two rotational DoF.

It will be appreciated that the headphone adapter, in use, enables attachment of the headphone device with the head-mounted device. The headphone adapter is designed in a manner that such attachment provides flexibility in terms of adjusting the headphone device with respect to the head-mounted device whilst being attached, to provide a comfortable fit and ease of usage.

Optionally, when the headphone adapter is in use, the headphone device is capable of attaining a plurality of positions with respect to the headband of the head-mounted device, the plurality of positions comprising at least two of: an on-ear use position, an upright position, a rest position. In this regard, the user manually adjusts the headphone device to attain the plurality of positions. In particular, the user rotates the headphone device about at least one of: the first end, the second end, of the second element of the headphone adapter, as these ends have rotational joints implemented threat. The rotational joints in the headphone adapter provide a varied range of rotational movement to the elements of the headphone adapter, and in turn, facilitate the headphone device to attain a wide variety of positions with respect to the headband of the head-mounted device. Some of these positions are discussed in detail below.

The "on-ear use position" is a position wherein the headphone device is arranged with respect to the headband of the head-mounted device in a manner that earpads/earpieces of the headphone device rest on/in the user's ears in a required manner for providing sound signals to the user's ears. When the headphone device has earpads, the earpads cover the use's ears at least partially in this position. In this position, the second element is arranged away from the user's head and is in proximity of the second part of the first element. Such an arrangement of the second element lowers the earpads/earpieces of the headphone device with respect to the headband of the head-mounted device. Optionally, in the on-ear use position, the second element is in contact with the first element.

The "upright position" is a position wherein the headphone device is arranged with respect to the headband of the head-mounted device in a manner that the earpads/earpieces of the headphone device are arranged above/outside of the user's ears. In this position, the headphone device is ready to be taken off the user's head. Optionally, when adjusting the position from the on-ear use position to the upright position, the user flexes the headband of the headphone device away from the user's head to rotate the second element in a manner that upon said rotation, the second element is brought close to the user's head. The arrangement of the second element upon said rotation raises the earpads/earpieces of the headphone device with respect to the headband of the head-mounted device. Optionally, in the upright position, an angle between the second element and the second part lies in a range of 170 degrees to 200 degrees. For example, the angle between the second element and the second part may be from 170, 172, 175, 180, or 190 degrees up to 185, 190, 195, 198, or 200 degrees.

The "rest position" is a position wherein the headphone device is arranged to rest against the headband of the head-mounted device and the headphone device is not in use. In the rest position, the headphone device may rest parallelly or obliquely against the headband of the head-mounted device. In a case when the headphone device has earpads, the earpads may rest against the headband of the head-mounted device. In another case when the headphone device has earpieces, the earpieces may rest against the headband of the head-mounted device or may hang freely. Optionally, when adjusting the position from the upright position to the rest position, the user rotates the headband of the headphone device about the second end of the second element.

The present disclosure also relates to the system as described above. Various embodiments and variants disclosed above, with respect to the aforementioned first aspect, apply mutatis mutandis to the system.

Optionally, in the system, the at least one headphone adapter comprises a first headphone adapter that is arranged on a first side of the head-mounted device and a second headphone adapter that is arranged on a second side of the head-mounted device, when in use. In this regard, an amount of the at least one headphone adapter is two. The first side of the head-mounted device is in proximity of a first ear of the user whereas the second side of the head-mounted device is in proximity of a second ear of the user. The first side and the second side are opposite to each other. The first ear may be a left ear of the user and the second ear may be a right ear of the user, and vice versa. In this implementation, multiple (i.e., two) headphone adapters are employed to securely attach the headphone device to the head-mounted device from two sides to ensure a good fit. This allows the user to move around freely whilst using the head-mounted device having the headphone device attached thereto, without the headphone device misaligning with the user's ears, falling off the headband of the head-mounted device, and similar.

DETAILED DESCRIPTION OF THE DRAWINGS

Figure 1A:
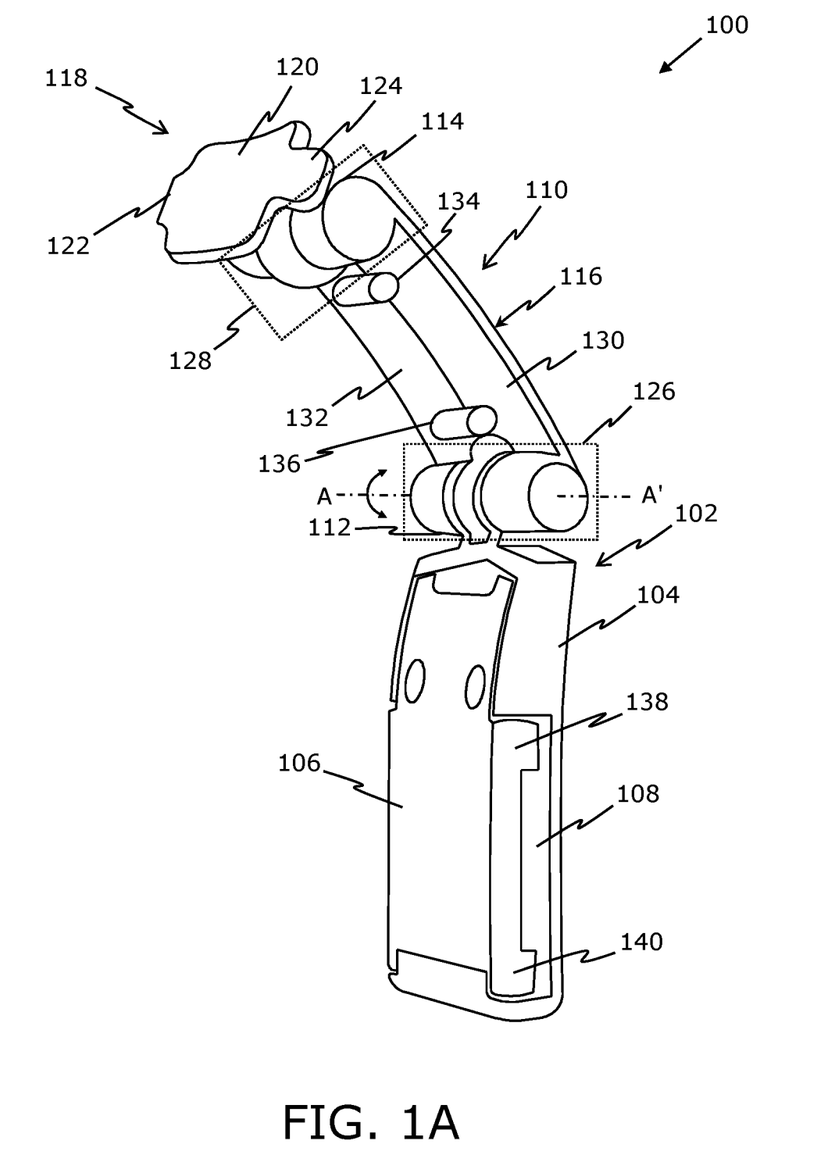
Figure 1B:
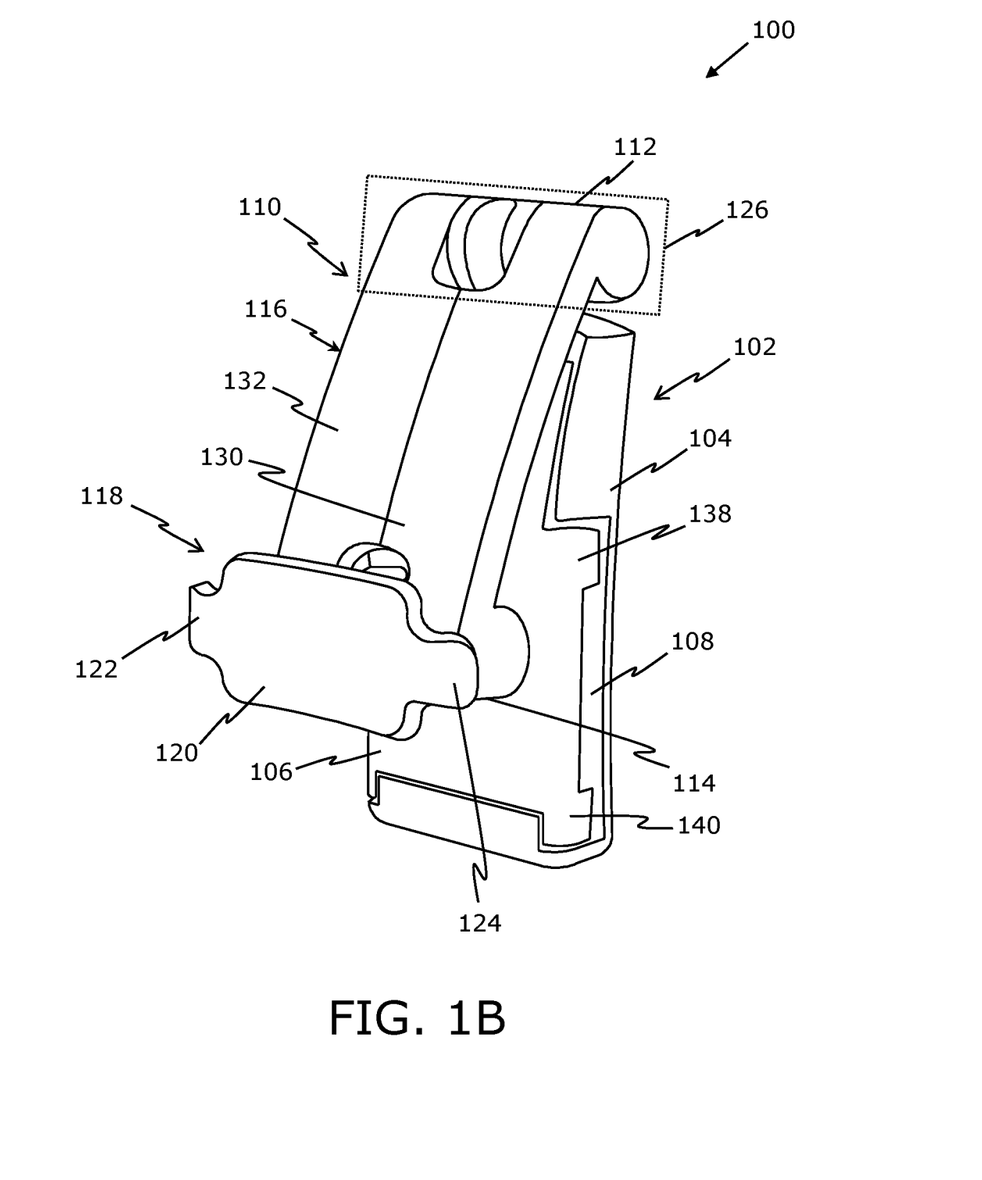
Figure 1C:
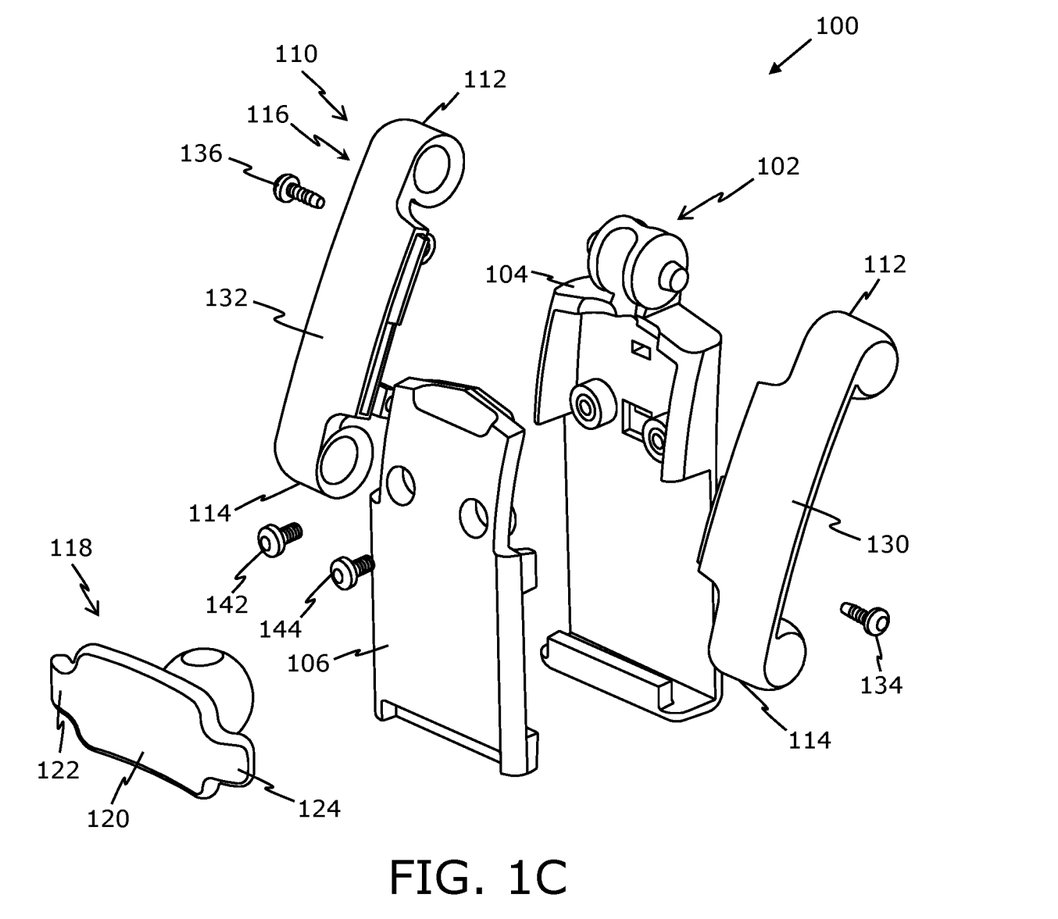
FIG. 1C illustrates an exploded view of the headphone adapter, in accordance with an embodiment of the present disclosure.

Referring to FIGS. 1A, 1B, and 1C, FIGS. 1A and 1B illustrate perspective views of a headphone adapter 100, while FIG. 1C illustrates an exploded view of the headphone adapter 100, in accordance with an embodiment of the present disclosure. The headphone adapter 100 has: a first element 102 having a first part 104 and a second part 106 that is attached to the first part, wherein a recess 108 (not shown in FIG. 1C) is defined between the first part 104 and the second part 106; a second element 110 having a first end 112, a second end 114 opposite to the first end 112, and at least one third part 116 extending between the first end 112 and the second end 114, wherein the second element 110 is rotatably attached to the first element 102 at the first end 112; and a third element 118 having a fourth part 120 and attachment parts 122 and 124 extending from the fourth part 120, wherein the fourth part 120 is rotatably attached to the second element 110 at the second end 114. The headphone adapter 100, in use, enables attachment of a headphone device (not shown) to a head-mounted device (not shown) such that a headband of the head-mounted device passes through the recess 108 defined in the first element 102, and a headband of the headphone device is attached to the third element 118.

The attachment parts 122 and 124 are shown, for example, to be implemented as projecting tabs. The second element 110 is rotatably attached to the first element 102 at the first end 112 via a first joint 126 (shown in FIGS. 1A and 1B). The fourth part 120 is rotatably attached to the second element 110 at the second end 114 via a second joint 128 (shown in FIG. 1A). The at least one third part 116 comprises two third parts 130 and 132 (shown in FIGS. 1A-1C) that are joined longitudinally with each other using an attachment means 134 and 136 (shown in FIGS. 1A and 1C). When the headphone adapter 100 is in use, at least one tab portion (depicted as two tab portions 138 and 140 in FIGS. 1A and 1B) of the second part 106 presses the headband of the head-mounted device against the first part 104. The second part 106 is attached to the first part 104 using, for example, two screws 142 and 144 (shown in FIG. 1C). When the headphone adapter 100 is in use, an axis of rotation (not shown) of the fourth part 120 with respect to the second end 114 of the second element 110 is different from an axis of rotation A-A' (shown in FIG. 1A) of the first end 112 of the second element 110 with respect to the first element 102.

FIGS. 1A-1C are merely examples, which should not unduly limit the scope of the claims herein. A person skilled in the art will recognize many variations, alternatives, and modifications of embodiments of the present disclosure. For example, the at least one third part 116 may be formed as a single part. For example, the second part 106 may not have the two tab portions 138 and 140.

Figure 2A:
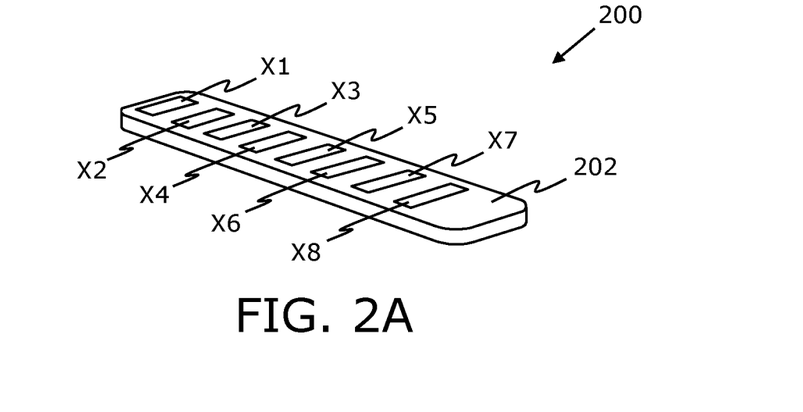
Figure 2B:
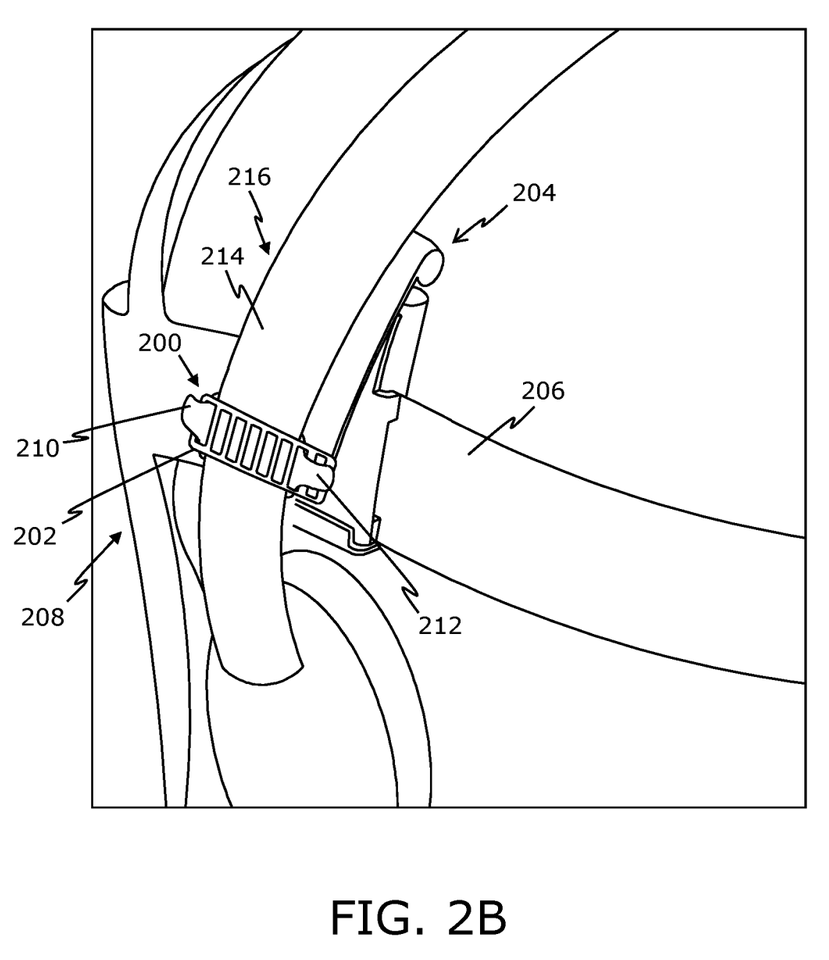
FIG. 2B illustrates the tying element of FIG. 2A in use, in accordance with an embodiment of the present disclosure.

Referring to FIGS. 2A and 2B, FIG. 2A illustrates a perspective view of a tying element 200, while FIG. 2B illustrates the tying element 200 of FIG. 2A in use, in accordance with an embodiment of the present disclosure. In FIGS. 2A and 2B, the tying element 200 is implemented as an elongate body 202 having a plurality of openings (for example such as 8 openings X1, X2, X3, X4, X5, X6, X7, and X8 marked in FIG. 2A only, for simplicity) therein. As shown in FIG. 2B, a headphone adapter 204 is attached to a headband 206 of a head-mounted device 208. The headphone adapter 204 further comprises the tying element 200 when attachment parts of the headphone adapter 204 are implemented as projecting tabs 210 and 212. The tying element 200 enables secure attachment of a headband 214 of a headphone device 216 to the projecting tabs 210 and 212. For example, as shown, two openings in the elongate body 202 are stretched and tightly fit around the projecting tabs 210 and 212.

FIGS. 2A and 2B are merely examples, which should not unduly limit the scope of the claims herein. A person skilled in the art will recognize many variations, alternatives, and modifications of embodiments of the present disclosure.

Figure 3A:
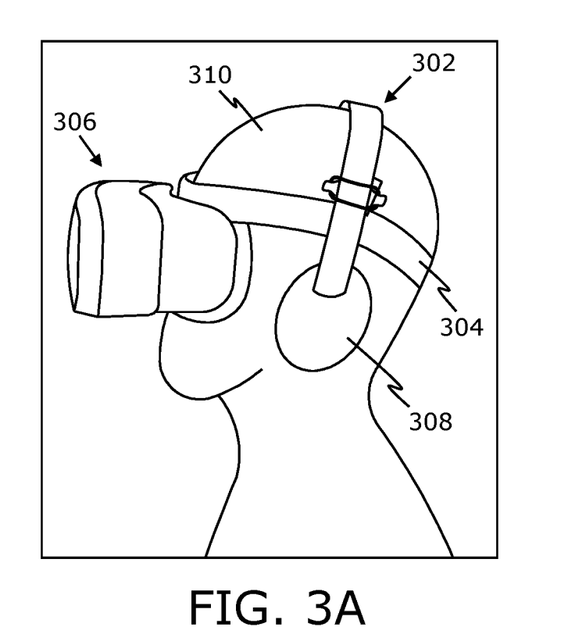
FIGS. 3A, 3B, and 3C illustrate a plurality of positions that can be attained by a headphone device with respect to a headband of a head-mounted device, in accordance with an embodiment of the present disclosure.
Figure 3B:
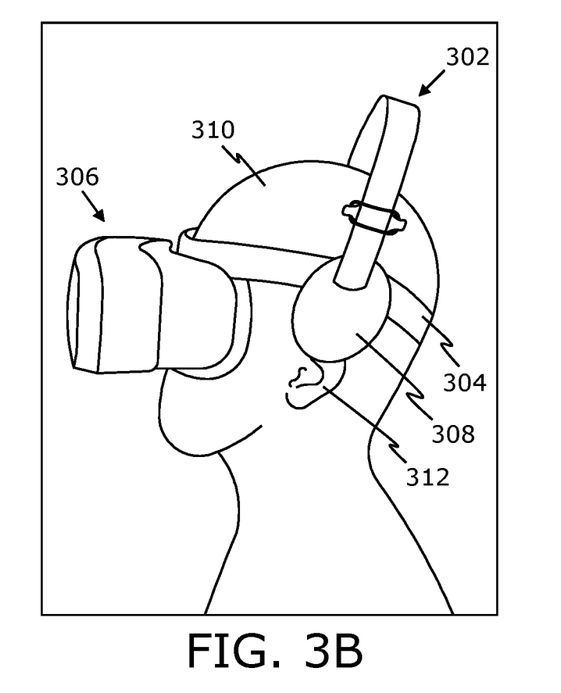
Figure 3C:
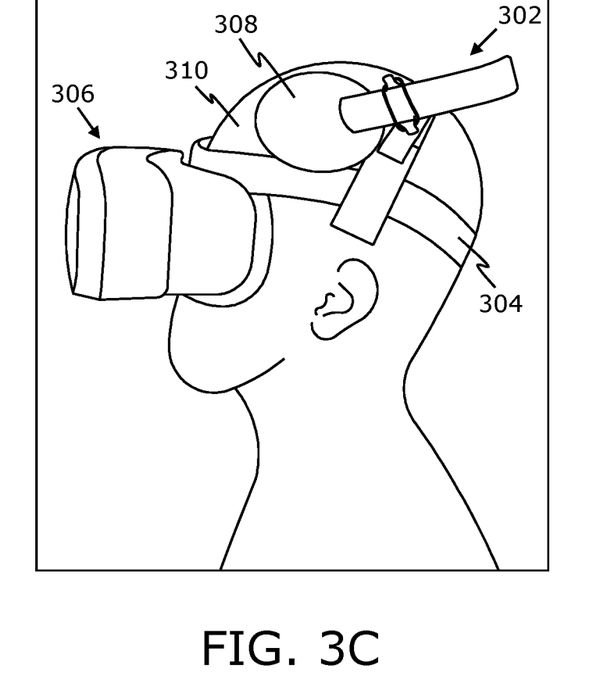

Referring to FIGS. 3A, 3B, and 3C, illustrated are a plurality of positions that can be attained by a headphone device 302 with respect to a headband 304 of a head-mounted device 306, in accordance with an embodiment of the present disclosure. In FIG. 3A, there is shown an on-ear use position of the headphone device 302 with respect to the headband 304. For example, in this position, a given earpad 308 of the headphone device 302 covers a given ear of a user 310. In FIG. 3B, there is shown an upright position of the headphone device 302 with respect to the headband 304. For example, in this position, a given earpad 308 of the headphone device 302 is arranged above a given ear 312 of a user 310. In FIG. 3C, there is shown a rest position of the headphone device 302 with respect to the headband 304. For example, in this position, a given earpad 308 of the headphone device 302 rests against the headband 304 of the head-mounted device 306.

FIGS. 3A-3C are merely examples, which should not unduly limit the scope of the claims herein. A person skilled in the art will recognize many variations, alternatives, and modifications of embodiments of the present disclosure. For example, various other positions besides the positions illustrated in FIGS. 3A-3C are attainable by the headphone device 302 with respect to the headband 304 of the head-mounted device 306.

Figure 4A:
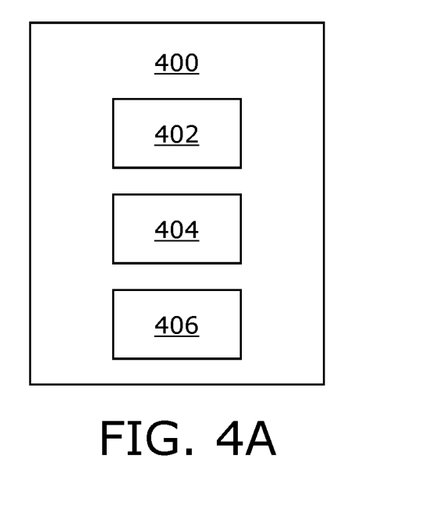
FIGS. 4A and 4B illustrate architectures of a system comprising a headphone device, a head-mounted device, and at least one headphone adapter, in accordance with different embodiments of the present disclosure.
Figure 4B:
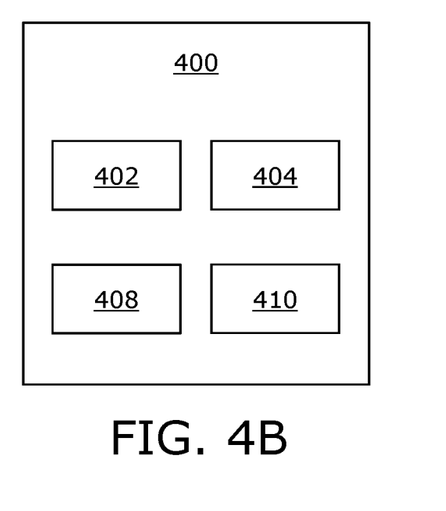

Referring to FIGS. 4A and 4B, illustrated are architectures of a system 400 comprising a headphone device 402, a head-mounted device 404, and at least one headphone adapter, in accordance with different embodiments of the present disclosure. The at least one headphone adapter enables attachment of the headphone device 402 with the head-mounted device 404. In FIG. 4A, the at least one headphone adapter comprises a (single) headphone adapter 406. In FIG. 4B, the at least one headphone adapter comprises a first headphone adapter 408 and a second headphone adapter 410.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A headphone adapter having:
   a first element having a first part and a second part that is attached to the first part, wherein a recess is defined between the first part and the second part;
   a second element having a first end, a second end opposite to the first end, and at least one third part extending between the first end and the second end, wherein the second element is rotatably attached to the first element at the first end; and
   a third element having a fourth part and attachment parts extending from the fourth part, wherein the fourth part is rotatably attached to the second element at the second end,
   and wherein the headphone adapter, in use, enables attachment of a headphone device to a head-mounted device such that a headband of the head-mounted device passes through the recess defined in the first element, and a headband of the headphone device is attached to the third element.

2. The headphone adapter of claim 1, wherein the attachment parts are implemented as projecting tabs, and wherein the headphone adapter further comprises a tying element for enabling secure attachment of the headband of the headphone device to the projecting tabs.

3. The headphone adapter of claim 2, wherein the tying element is implemented as at least one of: an elongate body having a plurality of openings therein, a band made from elastic material, a rubber band, a cable tie, a twist tie.

4. The headphone adapter of claim 1, wherein the second element is rotatably attached to the first element at the first end via a first joint, the first joint being one of: a cylindrical joint, a revolute joint, a ball and socket joint.

5. The headphone adapter of claim 1, wherein the fourth part is rotatably attached to the second element at the second end via a second joint, the second joint being one of: a ball and socket joint, a universal joint.

6. The headphone adapter of claim 1, wherein the second part is attached to the first part using at least one of: a screw, a bolt, a hook and loop fastener, a hinge.

7. The headphone adapter of claim 1, wherein when the headphone adapter is in use, an axis of rotation of the fourth part with respect to the second end of the second element is different from an axis of rotation of the first end of the second element with respect to the first element.

8. The headphone adapter of claim 1, wherein the at least one third part comprises two third parts that are joined longitudinally with each other using an attachment means.

9. The headphone adapter of claim 1, wherein when the headphone adapter is in use, the headphone device is capable of attaining a plurality of positions with respect to the headband of the head-mounted device, the plurality of positions comprising at least two of: an on-ear use position, an upright position, a rest position.

10. The headphone adapter of claim 1, wherein the headphone device is one of: an over-ear headphone device, an on-ear headphone device, an in-ear headphone device, hearing protection device.

11. The headphone adapter of claim 1, wherein the head-mounted device is one of: an extended-reality device, a display device, a helmet, a visor, a pair of goggles.

12. A system comprising a headphone device, a head-mounted device, and at least one headphone adapter according to claim 1.

13. A system according to claim 12, wherein the at least one headphone adapter comprises a first headphone adapter that is arranged on a first side of the head-mounted device and a second headphone adapter that is arranged on a second side of the head-mounted device, when in use.

* * * * *